Figure 1:
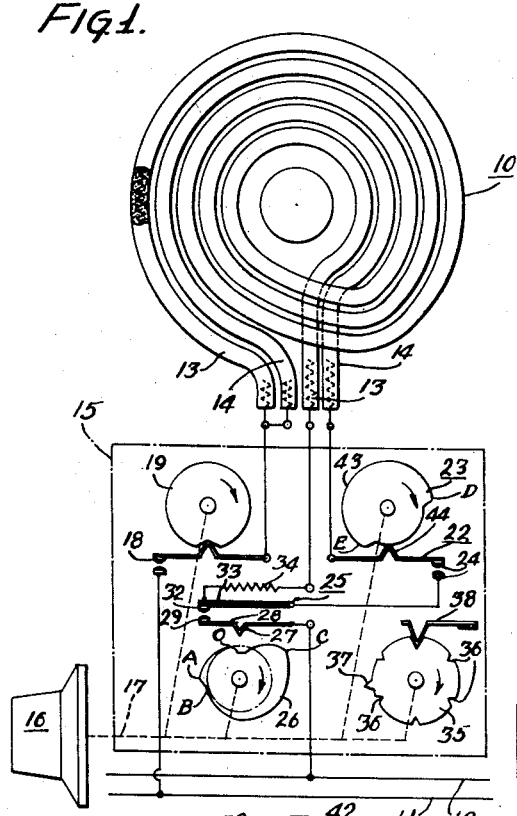

Sept. 29, 1959  C. R. TURNER  2,906,845
PARALLEL HEATING UNIT WATTAGE CONTROLLER SYSTEM
Filed Dec. 22, 1955  2 Sheets-Sheet 1

Inventor:
Charles Roger Turner
by Howson & Howson
Attys.

Sept. 29, 1959     C. R. TURNER     2,906,845
PARALLEL HEATING UNIT WATTAGE CONTROLLER SYSTEM
Filed Dec. 22, 1955     2 Sheets-Sheet 2

Inventor:
Charles Roger Turner
by Howson & Howson
Attys.

United States Patent Office 2,906,845
Patented Sept. 29, 1959

2,906,845

PARALLEL HEATING UNIT WATTAGE CONTROLLER SYSTEM

Charles Roger Turner, Springfield Township, Montgomery County, Pa., assignor to Proctor Electric Company, Philadelphia, Pa., a corporation of Pennsylvania Application December 22, 1955, Serial No. 554,661

3 Claims. (Cl. 219—20)

The present invention relates to a wattage controller system for controlling the wattage of an electric heater unit including two or more resistance heater elements arranged in parallel. In accordance with principles well established in this art, these elements are interconnected wtih a voltage source through a switch connection by which only one of the elements is energized when the unit is required to produce only a low rate of heat energization, but in which these elements are energized in parallel when it is desired to produce higher "heats." A familiar example to which this invention is especially applicable is the control of heat produced by an electric cooking range.

In addition to this fundamental switch connection, the invention includes a switch which is cycled between open circuit and closed circuit positions to control the energization of a single element or both elements, depending upon the circuit which has been established. This last-mentioned switch is preferably of the type illustrated and described in the patents to Vogelsberg, 2,623,137, and Clapp, 2,673,444, and includes a thermally- operable cycling member for actuating the switch contacts. As illustrated in these patents, this member is a bimetal carrying one of the switch contacts, which is heated by the intermittent conduction of current through an associated flat strip of metal to provide intermittent heating of the bimetal. The heater strip serves as a compression strut due to heat expansion, in transmitting force to the associated switch contact after closure thereof, and it contracts and augments the opening of the switch contacts upon cooling after opening thereof. Such switches have unusual merit in controlling electric cooking units, since they provide a substantial preliminary heating period during which the heating unit may be brought up to a desired temperature rapidly while the thermomotive control member reaches the temperature at which cycling commences, and this cycling provides reduction to an average rate of energization to maintain the temperature attained by the heating unit. The faculty of thermal memory inherent in the switch provides an automatic adjustment in the duration of the preliminary heating or flash which corresponds closely to required conditions, since the temperature of the thermomotive strip heater tracks the temperature of the heater unit which it controls, and thereby provides a shorter period of preliminary heating if current is turned on while the heater unit under control still retains residual heat from a previous heating operation.

An object and feature of the present invention has been to provide a system in which optimum advantage is taken of the preliminary heating step discussed above to provide unusually rapid energization in the preliminary heating or flashing step.

This object is attained by connection of the heating unit to a source of voltage which is so high in relation to the resistance of the unit that it provides energization of the heater elements beyond the rated capacity of the unit in the preliminary heating step. The average rate of energization is then reduced by intermittent on and off cycling to a point within safe limits, after the unit has been brought up to the desired temperature.

The control of the cycling rate of the heating operation requires that a considerable range of adjustment be provided to produce energization which may vary from that required to produce gentle simmering of a small vessel to that required to produce heating of a large vessel to a very high temperature. Since this adjustment involves control of the switch contacts to change the ratio of the time during which they are closed to the time during which they are open, it is evident that this ratio must be controllable within wide limits. This aspect introduces additional problems. When a very high rate of instantaneous energization is provided, and this rate is reduced after preliminary heating to produce a gentle simmer, for example, the cycle length time of the switch is increased so much on account of the length of the open contact part of the cycle that the temperature of the heater unit and of the contents of the vessel being heated may fluctuate undesirably.

These problems are solved in part, in the practice of the invention, by the use of a single resistance heater element or coil for producing heat energization within in the lower part of the range desired, and use of the two coils in parallel for producing energization within the upper part of the range by actuation of an auxiliary switch to energize both of these coils. However, the problem of adequate and simple control is by no means fully solved even by this combination, for it is not practical to place in the hands of the general public an article requiring a complicated sequence of operating steps or judgment of a technical nature. It has therefore been a primary object of the invention to provide a system having the features discussed above in which all of the foregoing factors of control are provided in an operative combination with a single actuating member which, by simple movement in accordance with the most elementary instructions, produces all of the nicety of control desired. Such control involves not only the change from energization of a single element to parallel energization, but also a simultaneous change in the cycling ratio as this transition is effected. As a consequence of this combination, the change in energization rate is progressive as the operator moves the actuating member through the transition point, and he is not made aware, through sudden change in the heat developed or otherwise, of the fact that the transition has been made.

Figure 2:
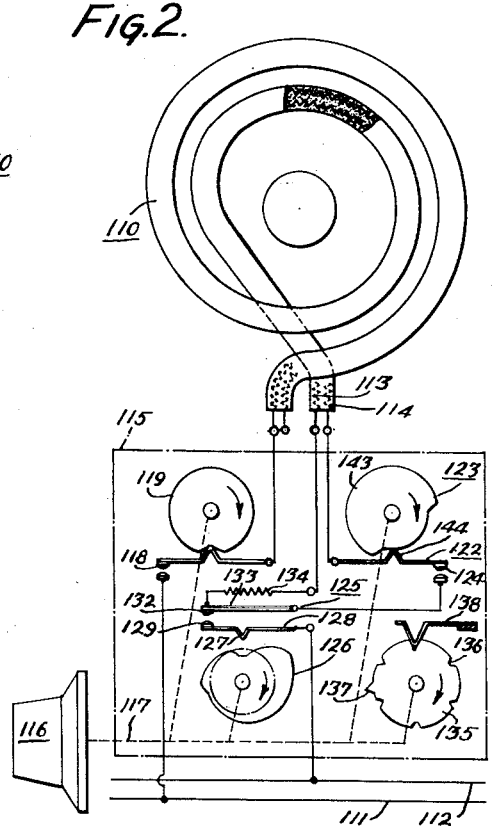
Figure 3:
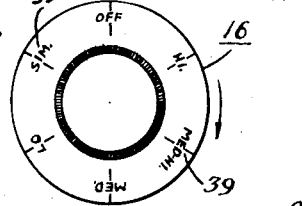
Figure 4:
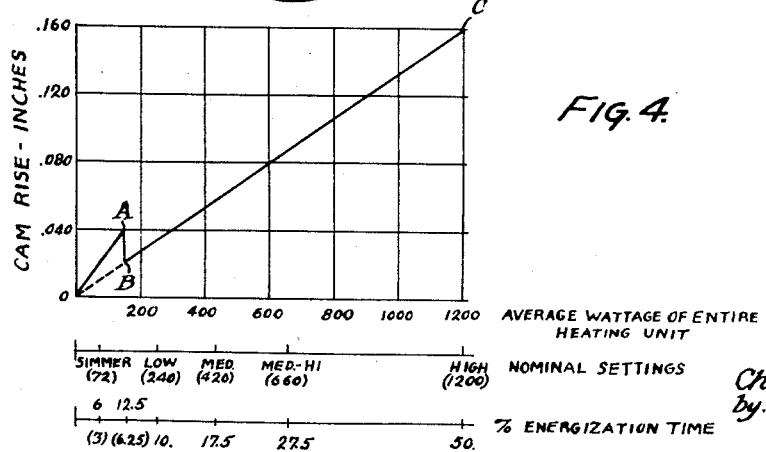
Figure 6:
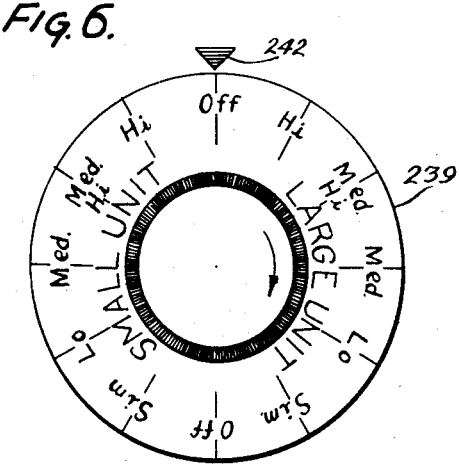
Figure 5:
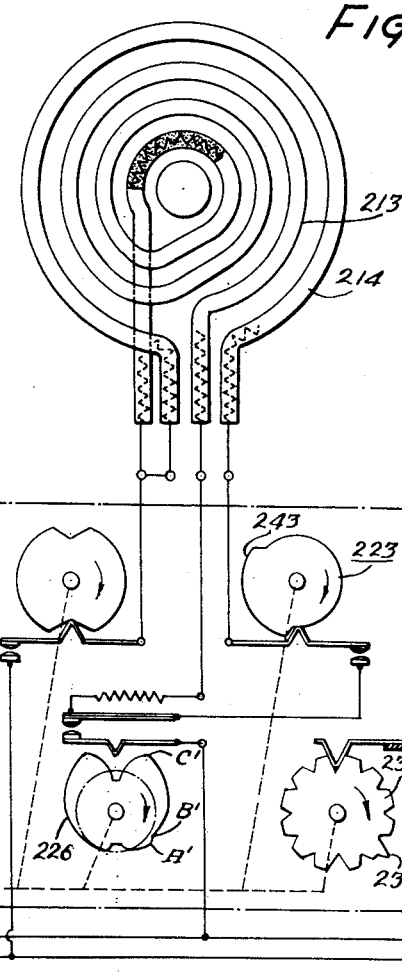

Still further objects and advantages of the invention, and the manner in which they have been attained, will be evident from reading of the following detailed description in the light of the attached drawing, in which, Figure 1 is a partly schematic plan view of a heating unit and control system embodying the features of the present invention, Figure 2 is a similar view illustrating practice of the invention in controlling a different form of heating unit, Figure 3 is a face view of the control knob and dial utilized for controlling the operation of the unit of either of Figures 1 or 2, Figure 4 is a graph illustrating the principle of the invention in transition from single coil to two coil energization, Figure 5 is a view corresponding to Figures 1 and 2, illustrating a modification, Figure 6 is a face view of the control knob and dial which may be used in the control of the unit of Figure 5.

Figure 1 shows the heating unit 10, which is connected to a two wire high voltage supply source which may embody lines 11 and 12 providing 236 volts across the heater. This heater includes interlaced heater elements 13 and 14 which are interconnected with the supply lines 11 and 12 through switch connections by which the heater unit 13 alone may be connected across the voltage source or by which the elements 13 and 14 may be connected across said source in parallel to provide a higher rate of instantaneous energization of the heater unit.

In the following discussion, we will assume for the purpose of illustration that the nominal rating of the heating unit 10 is 1200 watts, and that the resistances of each of elements 13 and 14 are chosen so that the instantaneous wattage of each element is 1200. On the basis of this last assumption, the elements will operate at double their rated capacity during the flashing period. At a given ratio of "on" to "off" time of switch 25, it is evident that the energization of the unit will be doubled when these elements are connected in parallel with the source, as compared with the rate of energiaztion when only a single element is connected and the other is disconnected. It should be understood, of course, that the rated capacities and resistances of coils 12 and 13 may differ from each other within the principles of the invention.

The apparatus for effecting the desired control and adjustment may be housed in a casing 15, and the desired adjustments may be effected through a control knob 16 which operates a shaft 17 projecting forwardly of the casing. The switch connections within the casing 15 may include a line disconnect switch 18 under control of a cam 19, a switch 22 under control of cam 23 and including contacts 24 which, when closed, establish a desired circuit connection in parallel through both of coils 13 and 14, and a current-operable thermostatic cycling switch 25 which is preferably of the type illustrated in the aforementioned Vogelsberg and Clapp patents. This switch is controlled by a cam 26 which, in operative position, bears against a projetcion 27 on a control blade 28 to provide overclosure of switch contacts 29 and 32, when the bimetal thermostatic element 33 of the switch is in cold condition. The extent of overclosure of contacts 29 and 32 controls the ratio of contact closed to contact open time which will be provided by the switch when the heater 34 is energized by passage of current therethrough. As noted above, the heater 34 is preferably a rigid metal resistance strip, operating according to the principle discussed in the aforesaid Vogelsberg and Clapp patents. In the position shown, the cycling switch 25 is in the inoperative or "off" position, thus providing a disconnect for supply line 12.

A detent cam 35 is also operated from the shaft 17 and includes a number of detent positions 36, and also an inverse detent 37, for co-action with a complementary detent follower blade 38. Each of the three control cams 19, 23 and 26, as well as the detent cam 35, is driven through one revolution by a single revolution of the shaft 17. While these four cams are illustrated as being peripheral cams of more or less conventional type, there may be substituted for these four peripheral cams a single face cam provided with cam contours which control actuation of followers for retaining the control apparatus in various positions of adjustment, and effecting these adjustments as discussed hereinafter. The control knob 16 may be provided with suitable indicia as indicated at 39 to apprise the operator of the particular heating position to which the system is adjusted.

The features of cam shape can best be explained in connection with a discussion of the adjustment of the system to provide various levels of energization of the heater unit 10. Assuming for example that it is desired to provide a very low heating rate, dial 16 may be moved from the inoperative position illustrated in a clockwise direction until the designation "Sim" (simmer) is opposite the index arrow 42. It may be locked in this position by the first detent notch 36 to the left of the position of detent cam follower 38 as illustrated. It will be seen that, in effecting this movement, each of cams 19, 23, 26 and 35 will be moved in a clockwise direction. This movement of cam 19 causes closure of the switch contacts 18, but the movement of cam 23 does not cause corresponding closure of the contacts 24 of switch 22. The only heating element which can therefore be energized in this position of adjustment is the coil 13, and a circuit is completed from line 11 through switch contacts 18, coil 13 and the cycling switch 25 to return line 12. The coil 13 will therefore be energized from the 236 volt source to heat coil 13 rapidly until the thermomotive bimetal member 33 is heated from the heater 34 by current passing through this heater to a temperature effecting opening of switch contacts 29 and 32. The heating period will be relatively brief, since the contacts 29 and 32 are only lightly overclosed in this low heat setting, but it will be sufficient to effect substantial preliminary heating. After the first opening of the contacts 29 and 32, there will be an interval during which no heat energy is produced by the element 13, until the circuit connection is again closed by the cooling of thermomotive member 33. The contacts 29 and 32 will then be sequentially closed and opened by the sequential cooling and heating of the member 33 incident to the interruption of current through the heater 34 and resumption of said current by closure of contacts 29 and 32. In this particular embodiment the "simmer" heat is selected at 72 watts average. Therefore, the ratio of the time during which contacts 29 and 32 are closed to the time during which they are open will be relatively small at this heat setting, for example in the neighborhood of 6%, assuming the instantaneous watage of 1200 discussed above.

Assuming now that it is desired to energize the unit at a higher rate to provide a rate of heating corresponding to a position of the knob 16 between simmer and "Lo," for example 150 watts, the knob will be rotated to that position, with the consequence that the point designated A on the cam 26 will be in contact with cam follower projection 29, instead of the point corresponding to the simmer setting. Since the point A is a longer radial distance from the center of the cam than the points between point A and point O (which represents the position where contacts 29 and 32 are first barely closed) the contacts 29 and 32 will be overclosed to a substantially greater extent than was the case at the simmer setting. The duration of the preliminary heating before contacts 29 and 32 are first opened will therefore be increase, as will also the ratio of contact closed to contact open times in the subsequent cycling of the switch (e.g., to 12.5%).

Assuming now that it be desired to provide a still higher rate of energization of the unit, the control knob 16 may be rotated still further in a clockiwse direction until a position beyond the point B of the cam is in operative engagement with cam follower 27, for example the "Lo" setting. It should be noted that the parts of the cam 26 between points A and B are points which are ineffective in adjustment of the apparatus, since these points correspond to the inverse detent 37 on the detent cam 35. This inverse detent is of sufficient slope on its opposite walls to prevent resting of the detent cam follower 38 along any part of these surfaces, so the knob 16 must therefore be rotated all the way from the position in which point A is effective against follower 27 to a position where point B is effective against that follower, before the next heat adjustment is reached after reaching point A.

By noting the contour of the cam 23, it will be seen that the raised portion 43 of its periphery comes into operative engagement with follower 44 somewhat ahead of the time follower 27 rides up on point B of cam 26, thereby closing switch contacts 24 and establishing a circuit through the heater element coil 14, switch 22, a highly conductive strip on bimetal 33 and contacts 32 and 29 which parallels the circuit already established through heating element 13. In this position of adjustment, and in all other positions of adjustment to engage follower 27 with points on the periphery of cam 26 between B and C, the two coils 13 and 14 will therefore be energized in parallel, with the consequence that the unit produces double the amount of heat for any given degree of overclosure setting of the switch contacts 29 and 32. Thus, in order to provide a continuous range of gradually changing energization rates of the unit 10, it is desirable that the contour of cam 26 change abruptly between points A and B so that there will be substantially less overclosure of the contacts at point B than at point A.

The nominal heat corresponding to the low setting is approximately 240 watts. This is obtained by cyclically energizing and de-energizing coils 13 and 14 in parallel at an "on" to "off" ratio of 10%, since the instantaneous wattage of the combined coils is 2400.

From the point B on cam 26, which corresponds circumferentially to the point D representing the effective beginning of the high part 43 of the periphery of cam 23, to the point C corresponding to the point E on cam 23, coils 13 and 14 will be energized in parallel at all positions of adjustment. There is a progressive rise in the profile part of cam 26 effective against follower 27 as it is moved through this range from the lowest point B to the highest point C, and the overclosure of contacts 29 and 32 is progressively increased to provide progressively greater energization of the two coils in parallel by this movement, as indicated by the indicia "Med-Hi" and "Hi" on dial 39.

From the foregoing discussion, it will be seen that the invention provides an automatic "finder" for the proper coil or combination of coils to give optimum cycle lengths for the various temperature levels, and that these combinations are established and correlated with simultaneous adjustment of ratio of "on" to "off" times established by the cycling switch without requiring any discretion or even knowledge by the operator in regard to these events. The significance of these aspects is graphically illustrated in Figure 4, where the ordinates represent cam rise beyond the position where initial engagement between contacts 29 and 32 is first established, and the abscissae represent average wattage outputs of the single coil or two coil energization after cycling of switch 25 has commenced. On the lowest line of that figure there is indicated the percentage of "on" to "off" time of switch 25 involved to provide the average wattage levels indicated.

In Figure 4, the line OA represents the operation of the unit at various points of adjustment of cam 26 between O and A in Figure 1. It will be seen that this line is twice as steep as the line OC representing the operation with the two coils energized in parallel; i.e., that the cam rise required to produce a given energization level when only the single coil 13 is energized is double that which would be required to produce corresponding energization level when using both coils in parallel. The line OB is illustrated in broken form in Figure 4, since this is an imaginary part of line OC insofar as the present invention is concerned, the two coils not being used in parallel to provide average wattages at the lower levels.

Assuming that the transition from single coil to two coil energization occurs just beyond the point A as indicated, and that this corresponds to 150 watts energization of the single coil 13, Figure 4 illustrates graphically the need for sharp change in slope of cam 26 in switching from single coil energization at point A to parallel coil energization at point B, for there must be a sharp cam drop to provide the same energy level in making this shift. As indicated by the numerals on the lowest two lines of Figure 4, if the cam shift from A to B is made to provide the switchover at the 150 watt or any other given level, the ratio of "on" to "off" time must be halved by this switchover (assuming equal resistance of the two coils). The numerals (3) and (6.25) in the lowest line of Figure 4 indicate the condition which would prevail if the two coils were to be used in parallel at the lowest levels, i.e., that it would be necessary to maintain the "off" times as long as 97% of the entire cycle length, with temperature fluctuations which are minimized in practice of the invention. The problem of fluctuation is aggravated by the natural total cycle length characteristics of the thermal switch used with the invention. At the middle range of "on" to "off" periods, the total cycle time, i.e. one "on" plus one "off," is at a minimum, while at the very low ratios the total cycle time rises sharply. It is therefore doubly desirable to avoid these very low ratios.

The embodiment of Figure 2 is similar to that of Figure 1, except that the invention is here shown as applied to a heater unit of the well-known monotube construction. Every part of this form corresponds to the related form of Figure 1, cam 126 being identical with cam 26 etc., except that the coils 113 and 114, which correspond respectively to coils 13 and 14, are contained in a single surrounding shell 110, as well understood in this art. Both the interlaced unit 10 and the monotube unit 110 provide the operator with a unit that tends to give a relatively even heating over the entire surface of the unit. Thus the operator has a high speed heating effect over the entire unit without concern as to the manner of obtaining this result.

Figures 5 and 6 illustrate application of the invention to a unit comprising an inner coil 213, used alone when it is desired to heat a small vessel, and an outer coil 214, used in parallel with the inner coil in the upper parts of the heating range when a larger vessel is to be heated. In this form, the operator will switch dial 239 in the clockwise direction from the position illustrated in Figure 6 when he desires to heat the small unit, and the 180° arc to the left of the indicator position 242 illustrated will thus provide this single coil energization. When he desires to heat a larger vessel, he turns the dial to positions in the opposite 180° arc, with the consequence that coils 213 and 214 are energized in parallel at the higher positions corresponding to high part 243 of cam 223, and the coil 213 is energized singly at the lower parts of this cam. Points A', B' and C' of cam 226 correspond in function and cam rise to corresponding points A, B and C of cam 26 of Figure 1, and inverse detent 237 of cam 235 corresponds to inverse detent 37 of cam 35 in Figure 1. The primary difference between the two forms of control is that the 180° of cam 226 on the left as illustrated are relegated to control of heating of a small unit or vessel by the single coil 213, while the other 180° fulfills the function of the entire 360° of cam 26 of Figure 1, by providing the switchover and abrupt cam rise change to give smooth energization transition at the switchover point. In all forms, I utilize the principle of preliminary energization above the rated capacity of the unit or of the individual heaters.

It should be noted that, while the 180° arc to the left of the indicator position 242 is used in this embodiment to heat a small pan, this does not necessarily mean that the heat energization of the unit obtained from all positions on that side of the dial is lower in all cases than that obtainable from any setting on the right side, for these ranges may well overlap.

In the foregoing discussion, the invention has been somewhat oversimplified in the interest of lucidity in a number of regards. In the first plate, Figure 4 illustrates an operation in which the line AB represents the switchover from single coil to two coil operation involves a vertical drop; i.e., in which the transition is made from single coil to two coil operation at the same energization level. As a matter of practice, the energization level may be somewhat increased in making this transition, since the transition involves a movement of the dial which represents increased heat. There may even be a substantial gap between the highest heat produced by the single coil and the lowest heat produced by the parallel coils. It should also be noted that the shapes of cams 26, 126 and 226 are not necessarily of uniform slope in the portions designed to provide progressively increased energization in the single coil and two coil energization portions respectively, as they may include circular portions adjacent desired heat settings corresponding to detents 36, and the slope may be varied from mathematical theory to suit the psychology of the user.

While the invention has been illustrated only in relation to three specific embodiments, it will be evident that it may be modified in a number of ways without departing from its basic principles, and I therefore wish it to be understood that it is not to be limited in interpretation except by the scope of the following claims.

I claim:

1. In an electrical control system, an electric heating unit having at least two separate resistance heater elements, means to connect said elements to a source of electrical energy, a current-operable thermostatic cycling switch interconnected between said source and said heating unit, adjustment means to control the ratio of the time during which said switch is in open contact position to the time during which it is in closed contact position to thereby adjust the heat output of said unit, an actuating member movable in a single given direction through a range of positions to move said adjustment means to positions providing progressive increase in the heat output of said unit by adjustment of said ratio, said switch establishing closed circuit relationship of only one of said elements with said source through the early part of said movement, means controlled by further movement of said actuating member in the same given direction to establish a parallel closed circuit relationship of the other of said elements to said source while simultaneously increasing the ratio of open contact position time to closed contact position time of said switch, and means controlled by still further movement of said actuating member in the same given direction to provide progressive increase in the heat output of both of said elements.

2. In an electrical control system, an electric heating unit having at least two separate resistance heater elements, means to connect said elements to a source of electrical energy, a thermostatic cycling switch interconnected between said source and said heating unit, adjustment means including a cam to control the ratio of the time during which said switch is in open contact position to the time during which it is in closed contact position to thereby adjust the heat output of said unit, an actuating member movable progressively in a given direction through a range of positions to move said adjustment means to positions providing changes in heat output of said unit by adjustment of said ratio, said cam having a contour including a progressive change followed by an abrupt change and then by a further progressive change, said switch establishing closed circuit relationship of only a single one of said elements with said source through positions represented by the first-mentioned progressive change in the cam contour in said given direction, and means controlled by movement of said actuating member for establishing a parallel closed circuit relationship of the other of said elements to said source at the position represented by an abrupt change in the cam contour.

3. In an electrical control system, an electric heating unit having at least two separate resistance heater elemeans, means to connect said elements to a source of electrical energy, a current operable thermostatic cycling switch interconnected between said source and said heating unit, adjustment means including a cam to control the ratio of the time during which said switch is in open contact position to the time during which it is in closed contact position to thereby adjust the heat output of said unit, said cam having a contour including a portion on one side of an inoperative position providing a progressive change establishing progressively changed energization of said one element, and a portion on the other side of said inoperative position providing a progressive change followed by an abrupt change increasing the ratio of open contact position time to closed contact position time and then followed by a further progressive change, an actuating member movable progressively through a range of positions to move said adjustment means to positions providing progressive change in heat output of said unit by adjustment of said ratio, said switch establishing closed circuit relationship of only a single one of said elements with said source through the lower part of the heat range controlled by movement of said actuating member, and means controlled by movement of said actuating member through an intermediate heating position to a higher heating position for establishing a parallel closed circuit relationship of the other of said elements to said source while maintaining said closed circuit relationship through the operating element of said cycling switch at a point establishing a desired cycling ratio and through said one element, the shift to energization of said two elements in parallel combinedly at approximately the upper limit of said higher range, followed by a progressively changed energization of said two elements in parallel.

References Cited in the file of this patent

UNITED STATES PATENTS

| | | |
|---|---|---|
| 2,224,596 | Desfachelles | Dec. 10, 1940 |
| 2,549,461 | Haller | Apr. 17, 1951 |
| 2,728,842 | Turner | Dec. 27, 1955 |
| 2,798,929 | Wojcik | July 9, 1957 |
| 2,804,531 | Dadson | Aug. 27, 1957 |